United States Patent [19]

Matsui

[11] Patent Number: 4,682,097
[45] Date of Patent: Jul. 21, 1987

[54] CHARGING SYSTEM FOR AN AUTOMOTIVE ENGINE

[75] Inventor: Fujio Matsui, Musashino, Japan

[73] Assignee: Fuji Jukogyo Kabushiki Kaisha, Tokyo, Japan

[21] Appl. No.: 871,028

[22] Filed: Jun. 5, 1986

[30] Foreign Application Priority Data

Jun. 8, 1985 [JP] Japan .................................. 60-124762

[51] Int. Cl.⁴ ............................................... H02J 7/16
[52] U.S. Cl. ...................................... 320/64; 322/29; 322/25; 320/32
[58] Field of Search ............... 322/28, 29, 25; 320/64, 320/32

[56] References Cited

U.S. PATENT DOCUMENTS 3,353,090 11/1967 Sawyer .............................. 322/29 X
4,368,417 1/1983 Matsuyama ........................... 322/29
4,636,706 1/1987 Bowman et al. .................. 322/29 X Primary Examiner—R. J. Hickey
Attorney, Agent, or Firm—Martin A. Farber

[57] ABSTRACT

A balance vehicle speed at which mean charging current and mean discharging current are balanced is obtained. A charge stop vehicle speed corresponding to the balance vehicle speed is decided as a reference value. An actual vehicle speed is compared with the charge stop vehicle speed to produce a charge stop signal, when the actual vehicle speed is lower than the charge stop vehicle speed. A charging regulator is responsive to the charge stop signal for disabling the regulator so as to stop the charging of a battery.

3 Claims, 6 Drawing Figures

CHARGING SYSTEM FOR AN AUTOMOTIVE ENGINE

BACKGROUND OF THE INVENTION

The present invention relates to a system for controlling the charging of a battery for an automotive engine.

A conventional charging system is shown in FIG. 5. The system comprises an alternator 9 having conduction coils 7, field coil 8, rectifier 6, and regulator 5. When an ignition switch 3 is turned on, current flows in a circuit consisting of a battery 1, switch 3, lamp 2, terminal L in a connector 4, field coil 8 and transistor $T_{r2}$, thereby lighting up the lamp. On the other hand, transistors $T_{r1}$ and $T_{r2}$ become conductive, so that the current flows in the coil 8. When the voltage at a terminal B for the battery becomes equal to the voltage at terminal L, the lamp 2 turns off. When the charging voltage at a terminal IG becomes higher than a set value, a zener diode 12 becomes conductive to turn on a transistor $T_{r3}$. Thus, transistors $T_{r1}$ and $T_{r2}$ are turned off to de-energize the coil 8. Accordingly, the charging voltage decreases. Thus, the charging voltage is kept constant irrespective of amount of an electric load LD. In other words, even if the electric load is zero, the engine operates to rotate the rotor of the alternator to keep the set voltage. This means the loss of the output power of the engine and increase of fuel consumption.

SUMMARY OF THE INVENTION

The object of the present invention is to provide a system which controls a regulator for an alternator in dependence on loads so as to reduce loss of the output power of an engine.

According to the present invention, there is provided a charging system for an automotive engine having a regulator for regulating the charge of a battery, a vehicle speed sensor, an engine speed sensor, and an electric load sensor. The system comprises, first means for obtaining a balance vehicle speed at which mean charging current and mean discharging current are substantially balanced, second means for deciding a charge stop vehicle speed corresponding to the balance vehicle speed, comparing means for comparing an actual vehicle speed with the charge stop vehicle speed and for producing a charge stop signal, third means responsive to the charge stop signal for disabling the regulator so as to stop the charging of the battery.

The other objects and features of this invention will be apparently understood from the following description with reference to the accompanying drawings.

DETAILED DESCRIPTION OF THE PREFERRED EMBODIMENT

Figure 1:
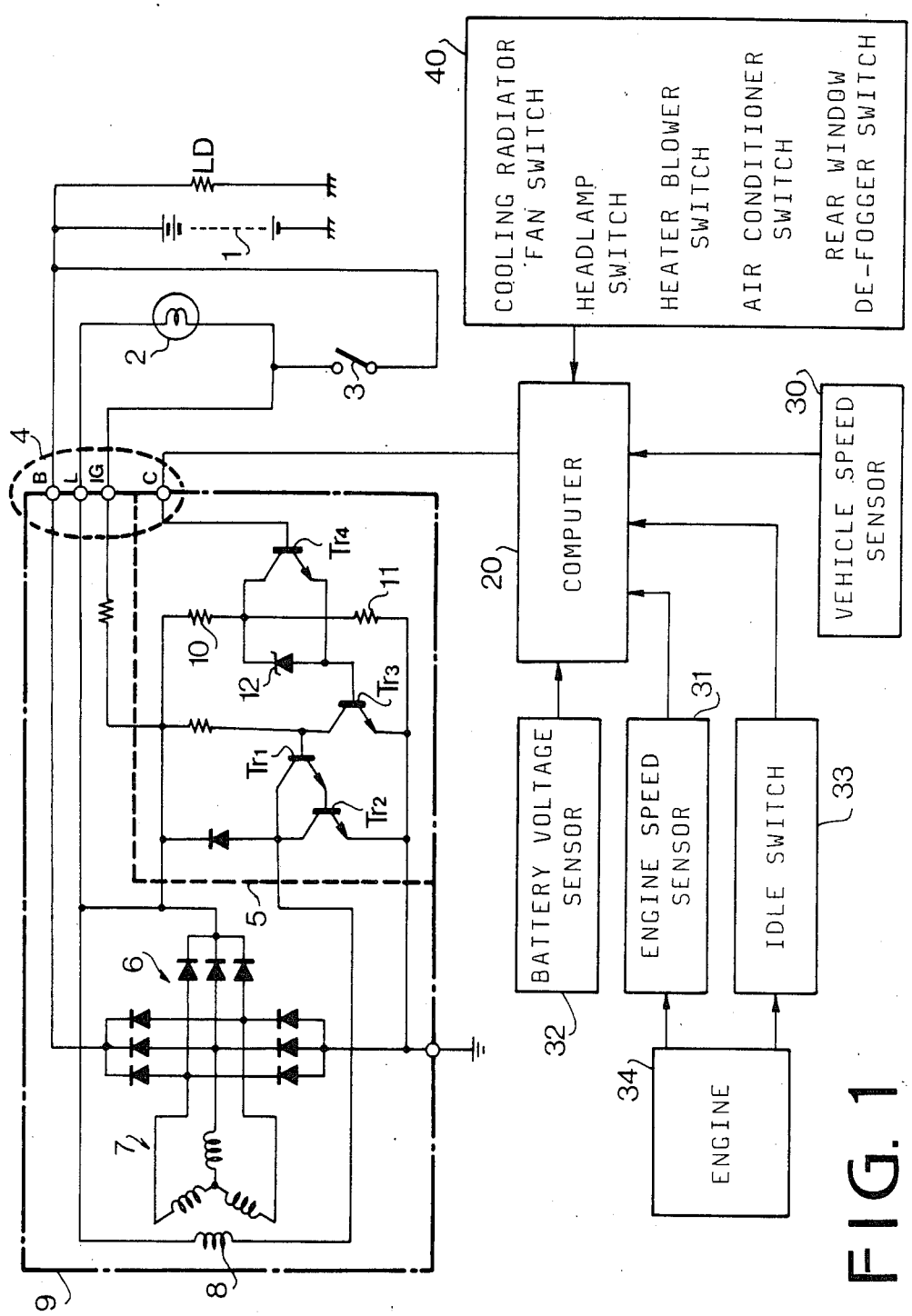
FIG. 1 is a schematic diagram showing a system according to the present invention.
Figure 5:
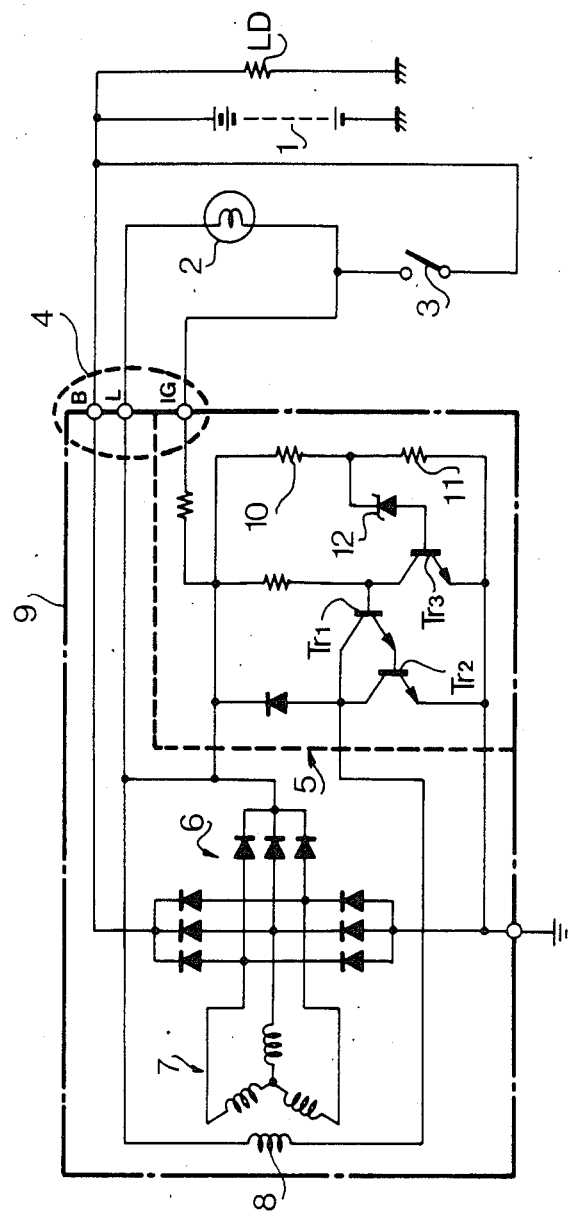
FIG. 5 shows a conventional charge system.

Referring to FIG. 1, the same parts as FIG. 5 are identified with the same reference numerals as FIG. 5. In the system of the present invention, a transistor $T_{r4}$ is connected to the zener diode 12 in parallel. The base of the transistor $T_{r4}$ is connected to an output of a computer 20 through a terminal C. The system is provided with a vehicle speed sensor 30, engine speed sensor 31, battery voltage sensor 32, idle switch 33 for detecting the idle operation of an automotive engine 34, and electric load sensor 40 comprising various load detecting switches such as a cooling radiator fan switch, headlamp switch, heater blower switch, air conditioner switch and rear window de-fogger switch.

Figure 2:
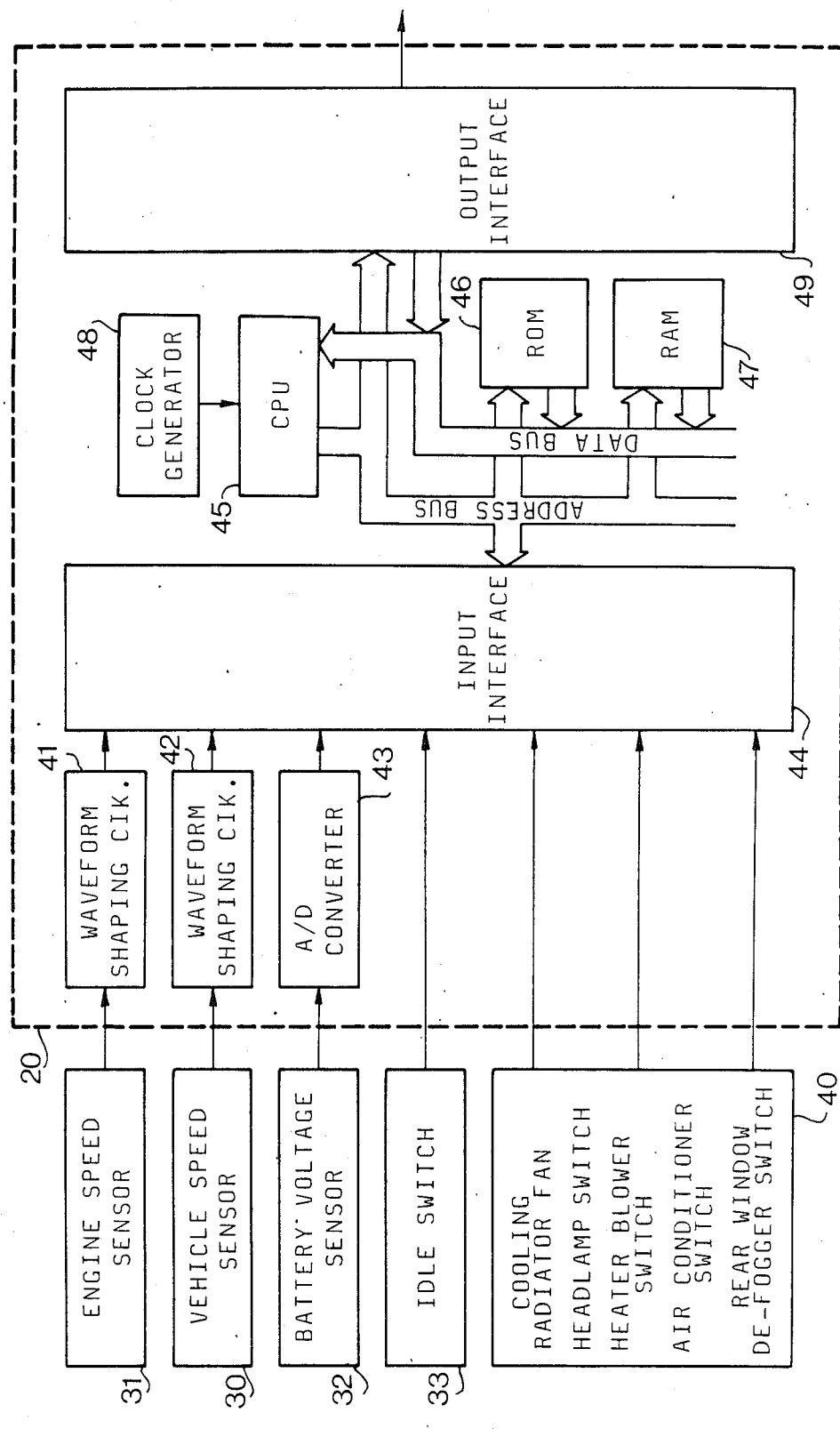
FIG. 2 is a block diagram of a computer system.

As shown in FIG. 2, the computer 20 comprises waveform shaping circuits 41, 42 supplied with outputs of engine speed sensor 31 and vehicle speed sensor 30, respectively, an A/D converter 43 for the battery voltage sensor 32. The computer 20 is provided with an input interface 44 supplied with output signals of waveform shaping circuits 41, 42, A/D converter 43, idle switch 33, and load sensor 40; CPU 45; ROM 46; RAM 47; clock generator 48 and output interface 49. The computer operates to decide whether the vehicle driving condition is in a state necessary to charge the battery or not and produces an output from the output interface 49.

The operation will be described hereinafter with reference to FIGS. 3, 4a and 4b. At a step 50, outputs of load sensor 40 are checked to detect operated switches, and at a step 51, load current (iL) is calculated based on the detected switches. Engine speed (NE) is inputed at a step 52 and, at a step 53, generating current (iA) is obtained from a table in the ROM in dependence on the engine speed. The load current (iL) is subtracted from the generating current (iA) at a step 54 to produce a charge/discharge current (i). Thereafter, it is decided whether a set time elapses at a step 55. When the set time does not elapse, mean charge/discharge current (I) and mean vehicle speed (V) are obtained at steps 56 and 57 respectively. When the set time elapses, a regression line (A) (FIG. 3) representing the relationship between the mean charge/discharge current (I) and mean vehicle speed is obtained by the least squares method at a step 58 from a plurality of mean charge/discharge currents and mean vehicle speeds. In the graph of the step 58 in FIG. 3, the upper region than the abscissa (mean vehicle speed) is for charging current and lower region is for discharge current. Accordingly, the vehicle speed (called balance vehicle speed hereinafter) at the point at which the line A and the abscissa cross is a desirable vehicle speed for charging the battery in most proper conditions. Therefore, at a step 59, the balance vehicle speed is obtained. The balance vehicle speed is used for determining a reference value which is used for deciding whether charging should be done or not, as described hereinafter.

Figure 3:
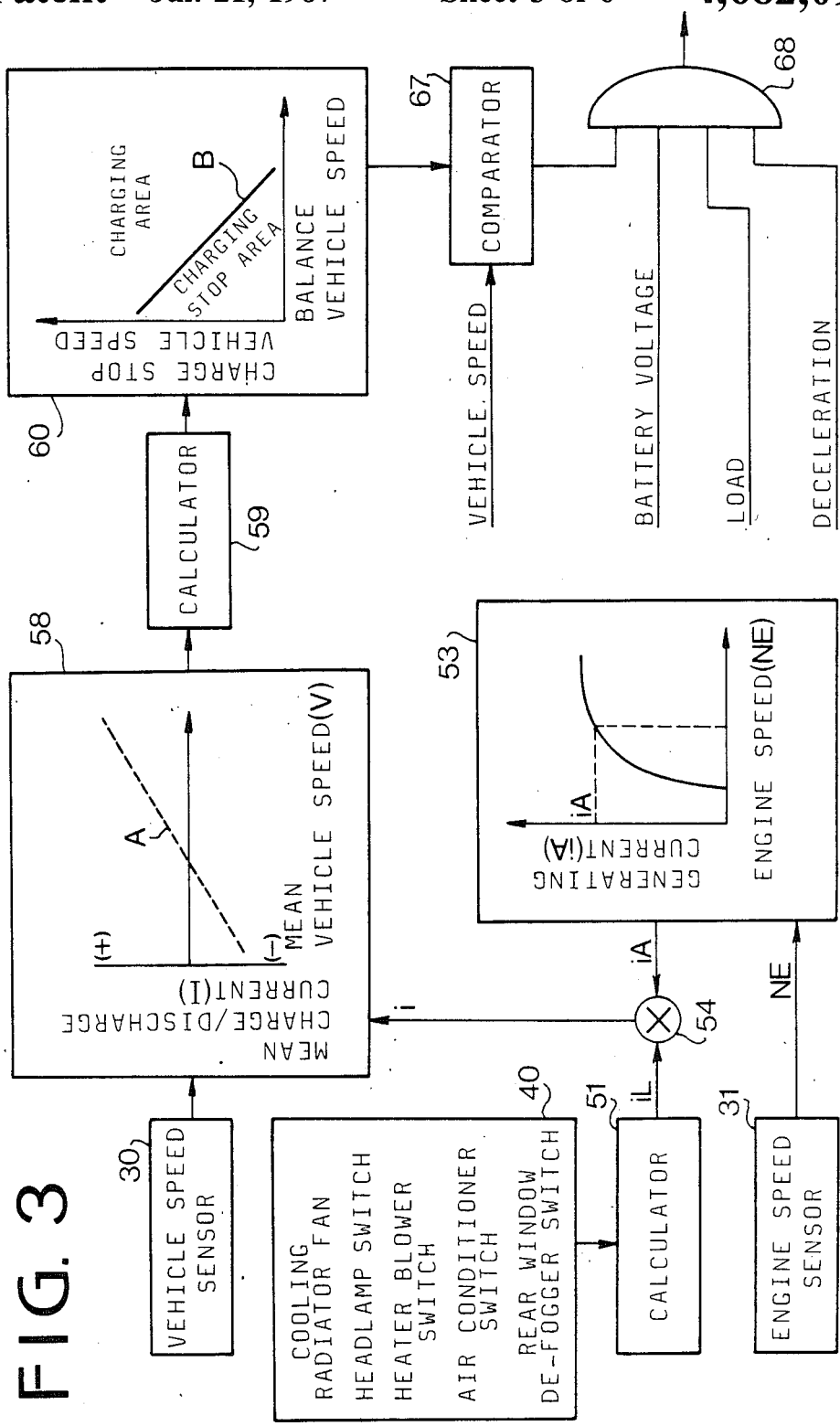
FIG. 3 is a block diagram for explaining the operation of the system of the present invention.
Figure 4A:
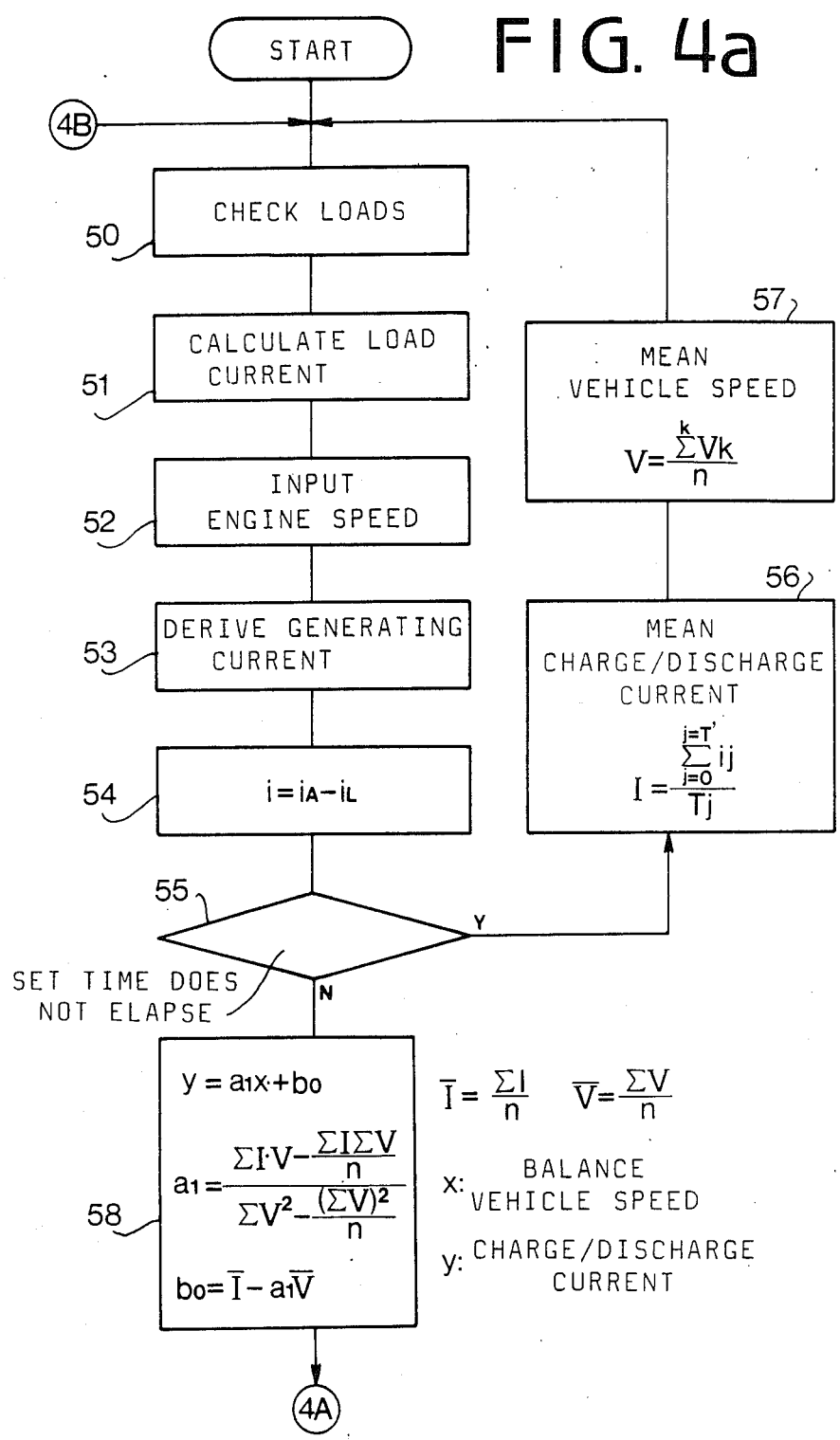
FIGS. 4a and 4b are flowcharts showing the operation.
Figure 4B:
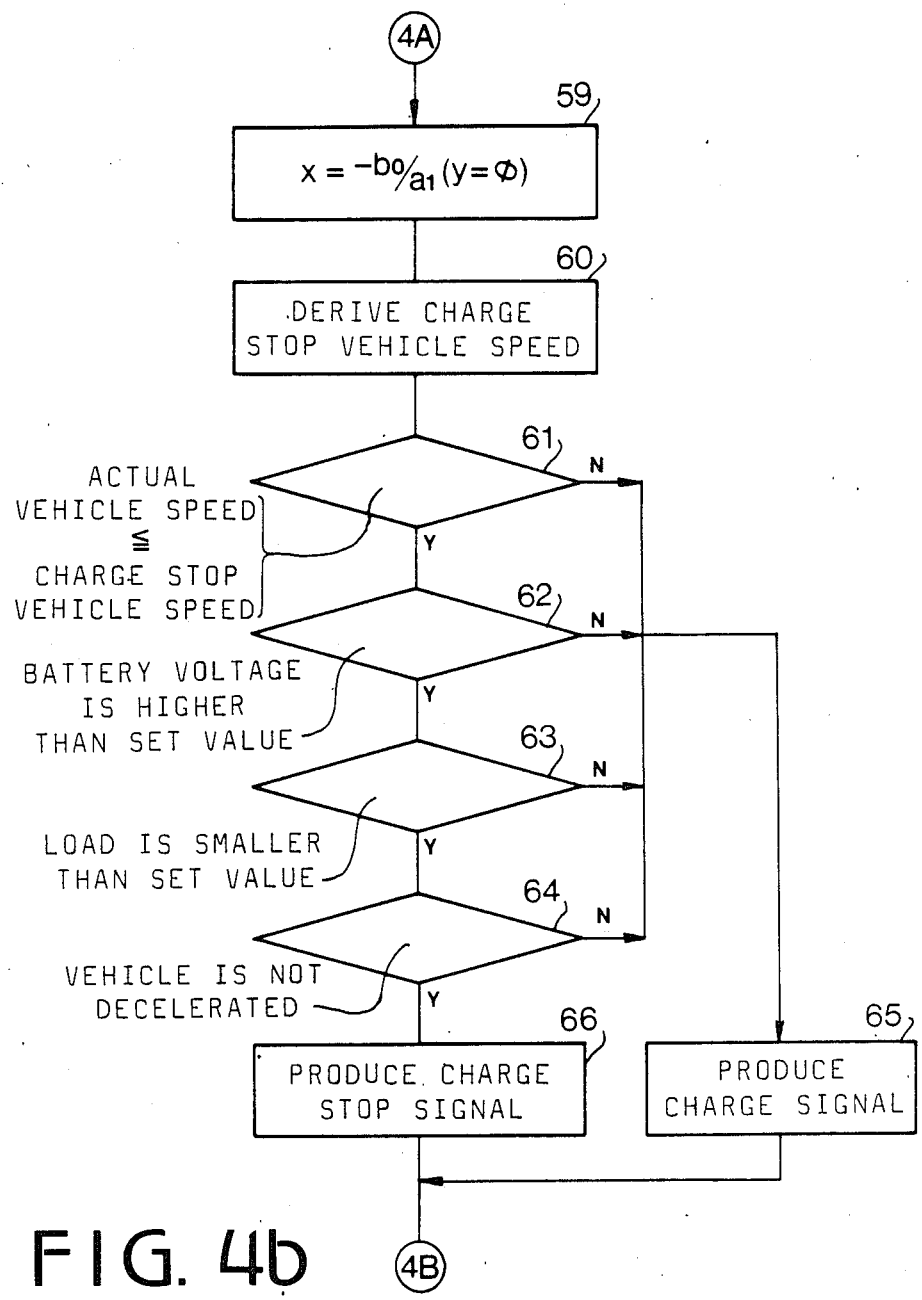

As shown in a step 60 of FIG. 3, a charge stop vehicle speed line B is stored in the ROM as the reference value. More particularly, the fact, for example, that the balance vehicle speed is high in a driving condition, means that the frequency of charging is small. In other words, the battery is in an excessive discharge state. Accordingly, charge stop vehicle speed range must be set to a small range. Thus, the charge stop vehicle speed is set to reduce as the balance vehicle speed increases. At the step 60 of FIG. 4b, a charge stop vehicle speed corresponding to the balance vehicle speed is derived from the ROM. The charge stop vehicle speed is compared at a step 61 with actual vehicle speed sensed by the vehicle speed sensor 30 by a comparator 67. When the actual vehicle speed is lower than the charge stop vehicle speed, the comparator 67 produces a high level output which is applied to an AND gate 68. The AND gate is supplied with outputs of battery voltage sensor 32, electric load sensor 40 and vehicle speed sensor 30. When the battery voltage is higher than a set value (at a step 62), when load is smaller than a set value (at a step 63) and when the vehicle is not decelerated (at a step 64), the AND gate 68 produces a charge stop signal having a high level (at step 66). The signal is applied to the base of the transistor $T_{r4}$, so that the transistor becomes conductive to turn on the transistor $T_{r3}$. Thus, the field coil 8 is de-energized to stop the charging of the battery. To the contrary, if one of outputs at steps 61 to 64 is at low level, the AND gate 68 produces a charge signal having a low level which renders the transistor $T_{r4}$ non-conductive (at step 65). Thus, the system becomes an ordinary state which is controlled by the regulator 5.

While the presently referred embodiment of the present invention has been shown and described, it is to be understood that this disclosure is for the purpose of illustration and that various changes and modifications may be made without departing from the scope of the invention as set forth in the appended claims.

What is claimed is:

1. A charging system for an automotive engine having a regulator for regulating the charge of battery, a vehicle speed sensor, an engine speed sensor, and an electric load sensor, the system comprising:
   first means for obtaining a balance vehicle speed at which mean charging current and mean discharging current are substantially balanced;
   second means for deciding a charge stop vehicle speed corresponding to the balance vehicle speed;
   comparing means for comparing an actual vehicle speed with the charge stop vehicle speed and for producing a charge stop signal;
   third means responsive to the charge stop signal for disabling the regulator so as to stop the charging of the battery.

2. The system according to claim 1 wherein the first means comprising means for obtaining generating current based on the output of the engine speed sensor, means for obtaining mean charging and discharging current dependent on the generating current and electric load, and means for obtaining mean vehicle speed dependent on the vehicle speed for a set time period.

3. The system according to claim 1 wherein the charge stop vehicle speed decreases with increase of the balance vehicle speed.

* * * * *